United States Patent
Teramura et al.

(10) Patent No.: US 8,422,012 B2
(45) Date of Patent: Apr. 16, 2013

(54) SPECTROMETER AND IMAGE FORMING APPARATUS HAVING THE SAME

(75) Inventors: Masayasu Teramura, Utsunomiya (JP); Kazumi Kimura, Toda (JP); Nobuyuki Tochigi, Kawaguchi (JP); Tokuji Takizawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 389 days.

(21) Appl. No.: 12/772,621

(22) Filed: May 3, 2010

(65) Prior Publication Data

US 2010/0277731 A1    Nov. 4, 2010

(30) Foreign Application Priority Data

May 1, 2009    (JP) .................................. 2009-111747

(51) Int. Cl.
*G01J 3/28*    (2006.01)
(52) U.S. Cl.
USPC ................................................... 356/328
(58) Field of Classification Search .................. 356/305, 356/328, 334
See application file for complete search history.

(56) References Cited

U.S. PATENT DOCUMENTS 4,784,935 A * 11/1988 Ehrfeld et al. ................ 430/321
5,123,740 A * 6/1992 Giebeler, Jr. .................. 356/331
5,159,404 A   10/1992 Bittner
6,181,418 B1 * 1/2001 Palumbo et al. .............. 356/328

FOREIGN PATENT DOCUMENTS

| EP | 2 154 498 A1 | 2/2010 |
| JP | 4-294223 A | 10/1992 |
| JP | 2008-304385 A | 12/2008 |

* cited by examiner

*Primary Examiner* — Kara E Geisel
(74) *Attorney, Agent, or Firm* — Rossi, Kimms & McDowell LLP

(57) ABSTRACT

There is provided is a spectrometer having a concave reflection type diffraction element, wherein, among surfaces other than a diffraction surface of the diffraction element, non-diffraction surfaces which are located outside the diffraction surface at the same side as the diffraction surface are a glossy surface, the spectrometer includes a light detection unit which is located at an imaging position of a first-order diffracted light diffracted by the diffraction element to receive the first-order diffracted light, and the light detection unit is disposed inside optical paths of light beams regularly reflected on the non-diffraction surfaces outside the diffraction surface. Accordingly, it is possible to effectively suppress a stray light reflected on the surfaces other the diffraction surface from being incident into the light detection unit and to detect the light spectrally diffracted by the diffraction surface at high accuracy.

10 Claims, 5 Drawing Sheets

SPECTROMETER AND IMAGE FORMING APPARATUS HAVING THE SAME

BACKGROUND OF THE INVENTION

The present invention relates to a spectrometer and an image forming apparatus having the spectrometer, and more particularly, to a spectrometer including an aperture stop, a diffraction element, and a light detection unit, which are disposed on a circumference of a Rowland circle, and being suitable to detect light having an arbitrary wavelength and an image forming apparatus having the spectrometer.

DESCRIPTION OF THE RELATED ART

Conventionally, there has been a Rowland type spectrometer wherein an incident aperture stop, a reflection type diffraction element, and a light detection unit are disposed on a circumference of a Rowland circle (Japanese Patent Application Laid-Open No. H04-294223). In the Rowland type spectrometer, light reflected on a non-diffraction surface other than a diffraction surface of the diffraction element as stray light (ghost light) may be incident into the light detection unit.

If the stray light reflected on the non-diffraction surface other than the diffraction surface is incident, all output voltages of a plurality of the light detection units disposed in a spectral direction are offset. As a result, in detection of color light of a low-luminosity object, particularly, a black object, the stray light causes a detection error. In the related art, there has been disclosed an optical apparatus where occurrence of the stray light is suppressed (Japanese Patent Application Laid-Open No. 2008-304385).

In the spectrometer discussed in Japanese Patent Application Laid-Open No. 2008-304385, a light absorption layer is disposed in an area where the diffracted light diffracted by the diffraction surface passes through, so that the stray light is absorbed and the occurrence of the stray light is suppressed. As a method for preventing the stray light from being incident into the light detection unit, there is a method in which an aperture stop of limiting a light beam that is incident into the diffraction element is disposed so that light is not incident into any area other than the diffraction surface. In addition, there is a method where a size of the diffraction element is designed to be sufficiently increased, so that light does not collide on any surface other than the diffraction surface. However, if the method for providing the light absorption layer, the method for disposing the aperture stop, and the method for increasing the size of the diffraction surface so as to prevent the stray light are used, the configuration of the spectrometer is complicated.

SUMMARY OF THE INVENTION

The present invention provides a spectrometer capable of effectively suppressing stray light that is reflected from a surface other than a diffraction surface from being incident into a light detection unit and capable of detecting spectral light from the diffraction surface at a high accuracy.

One aspect of the present invention is a spectrometer having a concave reflection type diffraction element which spectrally diffracts incident light beam, wherein, among surfaces other than a diffraction surface of the diffraction element, non-diffraction surfaces which are located outside the diffraction surface at the same side as the diffraction surface are a glossy surface, the spectrometer comprises a light detection unit which is located at an imaging position of a first-order diffracted light diffracted by the diffraction element to receive the first-order diffracted light, and the light detection unit is disposed inside optical paths of light beams regularly reflected on the non-diffraction surfaces outside the diffraction surface.

According to the present invention, it is possible to implement a spectrometer capable of effectively suppressing stray light that is reflected from a surface other than a diffraction surface from being incident into a light detection unit and capable of detecting spectral light from the diffraction surface at a high accuracy.

Further features of the present invention will become apparent from the following description of exemplary embodiments with reference to the attached drawings.

DETAILED DESCRIPTION OF PREFERRED EMBODIMENTS

Figure 1:
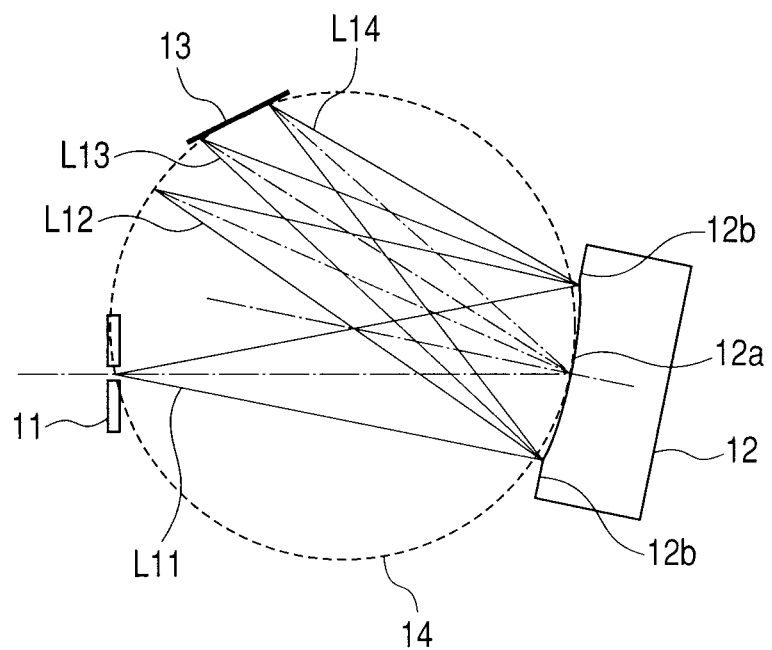
FIG. 1 is a schematic cross-sectional view illustrating a spectrometer according to a first embodiment of the present invention as viewed in a spectral direction.

Hereinafter, exemplary embodiments of the present invention will be described in detail with reference to the accompanying drawings. A spectrometer according to the present invention includes a concave reflection type diffraction element 12 and an incident aperture stop 11 that guides light from an object to the diffraction element 12. Among surfaces other than the diffraction surface 12a of the diffraction element 12, non-diffraction surfaces 12b which are disposed at two sides of a diffraction direction of a diffraction surface 12a at the same side as the diffraction surface 12a are constructed with a glossy surface. A light detection unit 13 that receives a first-order diffracted light is disposed at a position corresponding to an imaging position of the first-order diffracted light that is reflected by the diffraction element 12. The light detection unit 13 is disposed inside optical paths of light beams reflected by the non-diffraction surfaces 12b of the two sides and outside an optical path of a zeroth-order diffracted light from the diffraction surface 12a. In addition, the incident aperture stop 11, the diffraction surface 12a, and the light detection unit 13 are disposed on a circumference of a concentric cycle (Rowland circle) 14.

First Embodiment

Now, a spectrometer according to a first embodiment of the present invention is described with reference to FIGS. 1 to 5.

Figure 2:
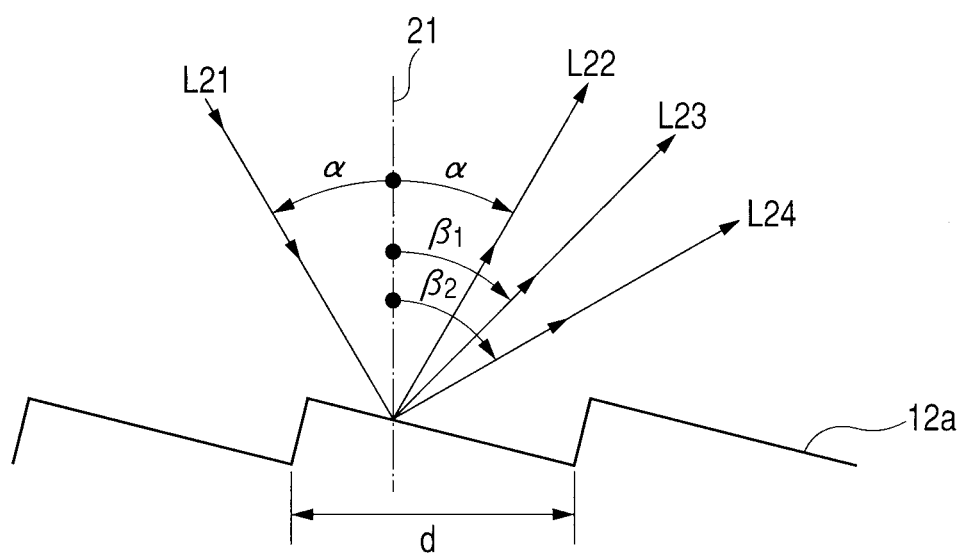
FIG. 2 is a view for explaining a relationship between a diffraction angle and a grating pitch of a diffraction grating.
Figure 3:
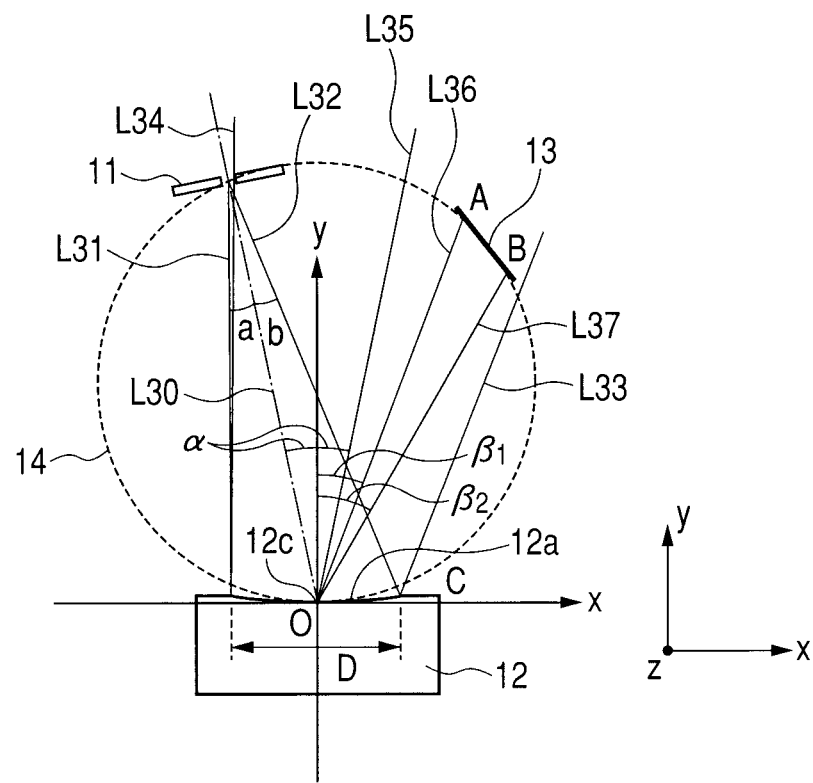
FIG. 3 is a view for explaining a locating site of a light detection unit of FIG. 1.
Figure 4:
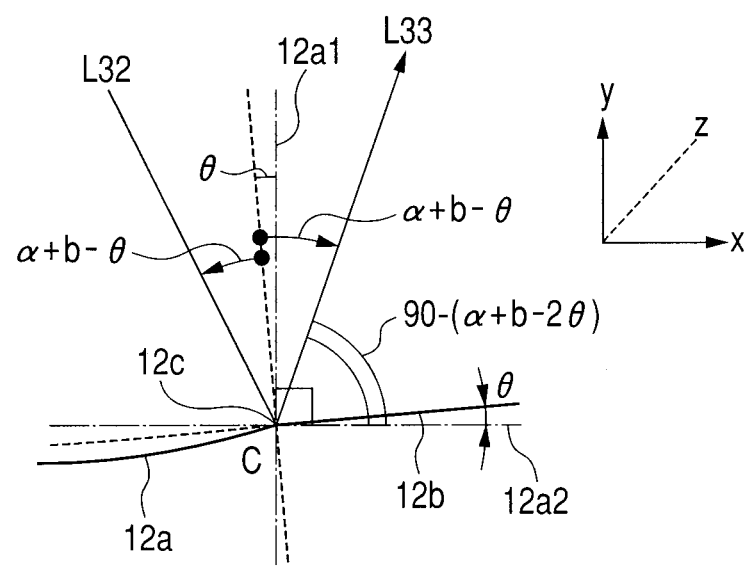
FIG. 4 is a view for explaining an angle of a light ray L33 reflected on a surface 12b with respect to the surface 12b other than a diffraction surface 12a of FIG. 3.
Figure 5:
FIG. 5 is a view illustrating a transmittance with respect to an incident angle in Fresnel reflection.

FIG. 1 is a schematic cross-sectional view illustrating the spectrometer according to the first embodiment of the present invention as viewed in a spectral direction. FIG. 2 is a view for explaining a relationship between a diffraction angle and a grating pitch of the diffraction element 12 of FIG. 1. FIG. 3 is a view for explaining a locating site of a light detection unit (sensor) 13 of FIG. 1. FIG. 4 is a view for explaining an angle of a light ray L33 reflected on a surface 12b with respect to a surface (non-diffraction surface) 12b other than a diffraction surface 12a of the diffraction element 12. In FIG. 4, an angle between a surface 12a2 perpendicular to a normal direction (y direction) of a surface vertex 12c of the diffraction surface 12a and the surface 12b other than the diffraction surface 12a is θ. FIG. 5 is a view illustrating a transmittance with respect to an incident angle in Fresnel reflection. In the figures, the incident aperture stop 11 that is disposed on the circumference of the Rowland circle 14 limits passing of light reflected or dispersed by an object (not illustrated). The concave reflection type diffraction element 11 has a diffraction surface 12a. In the diffraction surface 12a, the shape of a base surface is anamorphic, and a diffraction grating (grating), of which grating grooves are formed in an equal pitch, is inscribed.

In the embodiment, the surfaces 12b other than the diffraction surface 12a, which are disposed at two sides of a diffraction direction of the diffraction surface 12a at the same side as the diffraction surface 12a, have no curvature. For example, the surfaces 12b are configured to be planar surfaces. An angle θ between the surface 12a2 perpendicular the normal direction 12a1 of the surface vertex 12c of the diffraction surface 12a and the surface 12b other than the diffraction surface 12a is θ=0°. The surface 12b is a glossy surface which is formed by performing a buffing or glossing finishing process (mirror reflection). In addition, the diffraction element 12 is made from a resin. However, the material of the diffraction element 12 is not limited to a resin, but a high-reflectance material such as a metal may be used. In order to increase the reflectance of the diffraction surface 12a of the diffraction element 12, a reflection film may be formed on the diffraction surface 12a. Therefore, a sufficient reflected light amount can be obtained, so that detection accuracy can be easily increased. The reflectance of the surface 12b is lower than that of the diffraction surface 12a.

The light detection unit 13 is disposed on the circumference of the Rowland circle 14. The light detection unit 13 includes, for example, light detection devices such as CMOS sensors or photodiodes. The light detection unit 13 is configured to be a line sensor where the light detection devices are arrayed in a row in the spectral direction of the spectral light of the diffraction element 12. The light detection unit 13 may be configured to be an area sensor where the light detection devices are two-dimensionally arrayed. Due to this configuration, the detection signals can be recognized more accurately. The light detection unit 13 is disposed inside the optical paths of the light beams regularly reflected by the non-diffraction surfaces 12b that are disposed at outer sides of the diffraction surface 12a. The incident aperture stop 11, the diffraction element 12, and the light detection unit 13 are disposed on the circumference of the Rowland circle 14, so that the light diffracted by the diffraction element 12 can be detected by the light detection unit 13.

An incident light ray L11 is reflected on an object and passes through the incident aperture stop 11. A zeroth-order diffracted light (light ray) L12 is reflected on the diffraction surface 12a. A first-order diffracted light L13 has the shortest wavelength that is detected by the light detection unit 13. In the embodiment, the first-order diffracted light L13 has a wavelength of 380 nm. A first-order diffracted light L14 has the longest wavelength that is detected by the light detection unit 13. In the embodiment, the first-order diffracted light L14 has a wavelength of 730 nm. A reference axis (y axis) 21 corresponds to a normal line of the surface vertex 12c of the base surface (diffraction surface) 12a. An incident light ray L21 is incident into the diffraction surface 12a. An angle −α between the reference axis 21 and the incident light ray L21 is an incident angle. A light ray L22 is a zeroth-order diffracted light. An angle α between the reference axis 21 and the zeroth-order diffracted light L22 is a reflection angle. A light ray L23 is a first-order diffracted light (first-order light) having a wavelength $\lambda_1$. An angle $\beta_1$ between the reference axis 21 and the first-order light L23 is a diffraction angle. A light ray L24 is a first-order diffracted light (first-order light) having a wavelength $\lambda_2$. An angle $\beta_2$ between the reference axis 21 and the first-order light L24 is a diffraction angle. The incident angle α and the diffraction angle β are expressed by the following Equations.

$$\sin \alpha + \sin \beta_i = Nm\lambda_i \quad (1)$$

$$N = 1/d \quad (2)$$

Herein, N denotes the number of grating grooves per unit length of the diffraction surface 12a; m denotes a diffraction order; λ denotes a wavelength; i denotes a subscript; and d denotes a grating pitch of the diffraction surface 12a. A light ray L30 is a principal ray of a light beam that passes through the incident aperture stop 11. The principal ray L30 is incident into the surface vertex 12c of the diffraction surface 12a. In the figure, an angle between the y axis and the principal ray L30 is an incident angle α. Among the light rays that pass through the incident aperture stop 11, a light ray (marginal light ray) L31 is incident into a negative side (x<0) of the surface 12b other than the diffraction surface 12a. The angle between the principal ray L30 and the marginal light ray L31 is a. Among the light rays that pass through the incident aperture stop 11, a marginal light ray L32 is incident into a positive side (x>0) of the surface 12b other than the diffraction surface 12a. The angle between the principal ray L30 and the marginal light ray L32 is b.

A light ray L33 is the light ray that is closest to the diffraction surface 12a among the light rays that are reflected on the positive side of the surface 12b other than the diffraction surface 12a. A light ray L34 is the light ray that is closest to the diffraction surface 12a among the light rays that are reflected on the negative side of the surface 12b other than the diffraction surface 12a. A light ray L35 is a principal ray of a regularly reflected light (zeroth-order diffracted light) reflected by the diffraction surface 12a. In the figure, an angle between the y axis and the principal ray L35 is a reflection angle α. A light ray L36 is a principal ray of a first-order diffracted light that is obtained by reflecting the light having the shortest wavelength $\lambda_1$ (nm), which is detected by the light detection unit 13, by the diffraction surface 12a. In the figure, an angle between the y axis and the principal ray L36 of the first-order diffracted light is a diffraction angle $\beta_1$. A light ray L37 is a principal ray of a first-order diffracted light that is obtained by reflecting the light having the longest wavelength $\lambda_2$ (nm), which is detected by the light detection unit 13, by the diffraction surface 12a. In the figure, an angle between the y axis and the principal ray L37 of the first-order diffracted light is a diffraction angle $\beta_2$. The specifications of the spectrometer and the shape of the diffraction element 12 according the embodiment are listed in Tables 1 and 2.

TABLE 1

(Specifications of Spectrometer)

| | |
|---|---|
| spectral range | wavelength of 350 nm to 750 nm |
| slit width of incident aperture stop | 60 μm |
| detection device (light detection unit) | Si photodiode array |
| diffraction order m | 1 |
| pixel size of detection device | 25 × 500 μm |
| wavelength resolution | 3.3 nm |

TABLE 2

(Specifications of diffraction element)

| | |
|---|---|
| base meridional curvature radius [mm] | 17.50 |
| base sagittal curvature radius [mm] | 15.45 |
| effective diameter [mm] | 7 |
| Grating pitch [μm] | 2.52 |
| Grating height [μm] | 0.25 |
| blaze angle [°] | 5.72 |
| incident angle [°] | 12 |
| reflection film | multilayered film of Al base |

In the embodiment, the incident aperture stop 11, the diffraction surface 12a, and the light detection unit 13 are disposed on the circumference of the Rowland circle 14. The light rays that are reflected or dispersed by an object (not illustrated), of which color is to be measured, pass through the incident aperture stop 11 and are incident into the diffraction element 12. Among the light rays that are incident into the diffraction element 12, the diffracted light rays reflected by the diffraction surface 12a are focused on the circumference of the Rowland circle 14. Among the light rays that are incident into the diffraction element 12, the light rays reflected by the surface (non-diffraction surface) 12b other than the diffraction surface 12a are emitted as the regularly reflected light rays L35.

In FIG. 3, the surface vertex 12c of the diffraction surface 12a of the diffraction element 12 is set to the origin O(0, 0); the y axis is set to the normal direction (normal direction of the surface) of the diffraction surface 12a; and the x axis is set to the direction perpendicular to the y axis. The direction that passes through the origin O and is perpendicular to the x axis and the y axis (that is, perpendicular to the paper surface) is set to the z axis. Hereinafter, the shape in the xy cross section including the normal line of the surface (y axis) is set to the meridional shape, and the shape in the in-plan surface (yz cross section) perpendicular to the xy cross section including the normal line of the surface is set to the sagittal shape. The surface shape (bus shape) of the xy cross section of the base of the diffraction surface 12a is expressed by the following Equation (3).

$$y = \frac{x^2/R}{1 + \sqrt{1 - (1+k)x^2/R^2}} \quad (3)$$

Herein, R denotes a curvature radius of a surface; and the k denotes an eccentricity. When a coefficient of the positive side of the y axis (the upper portion of FIG. 1) is different from a coefficient of the negative side of the y axis (the lower portion of FIG. 1), the coefficient of the positive side is marked with a subscript u, and the coefficient of the negative side is marked with a subscript 1. In addition, the surface shape (sagittal shape) of the yz cross section of the base of the diffraction surface 12a is expressed by the following Equation (4).

$$S = \frac{z^2/r'}{1 + \sqrt{1 - (1+k)z^2/r'^2}} \quad (4)$$

In addition, the r' denotes a curvature radius of the yz cross section. The S denotes the shape of the sagittal line at an arbitrary point on the meridional line. In the diffraction surface 12a of the diffraction element 12, the curvature radius of the meridional line is 17.5 mm, and the curvature radius of the sagittal line is 15.2 mm. In addition, the effective area D is 7 mm. In addition, in the diffraction surface 12a, the diffraction grating similar to that of FIG. 2 is formed, and the grating pitch d of the diffraction grating is 2.52 μm, and the blaze angle θ is 5.72°. In this case, the number of grating grooves N is 396.8 grooves/mm. The light that is spectrally reflected by the diffraction element 12 is image-formed (focused) on the light detection unit 13 that is disposed on the circumference of the Rowland circle 14.

In the embodiment, the light rays detected by the light detection unit 13 are in a wavelength range of 380 to 730 nm. The light rays L13, L23, and L36 are the first-order diffracted lights having a wavelength of 380 nm. The light rays L14, L24, and L37 are the first-order diffracted lights having a wavelength of 730 nm. By Equations (1) and (2), in the case of m=1, the first-order diffraction angle $\beta_1$ for the wavelength of 380 nm is 21.0°, and the first-order diffraction angle $\beta_2$ for the wavelength of 730 nm is 29.8°. The light detection unit 13 is disposed in the area where the first-order diffracted light in wavelength range of 380 nm to 730 nm is received. In addition, in order that unnecessary light is not incident into the light detection unit 13, the light detection unit 13 needs to be disposed inside the optical paths of the light rays L33 and L34 that are reflected by the surfaces 12b other than the diffraction surface 12a. Since the radius R of the Rowland circle 14 is ½ the meridional curvature radius (=17.5 mm) of the diffraction surface 12a, R=8.75 mm. The equation of the Rowland circle 14 is expressed by the following Equation.

$$x^2 + (y-R)^2 = R^2 \quad (5)$$

In addition, the angles a and b of the marginal light rays L31 and L32 with respect to the principal ray L30 of the light beam that passes through the incident aperture stop 11 are a=11.8° and b=11.3°. The numerical aperture NA of the light beam that is emitted through the incidence aperture stop 11 is NA=0.2. In addition, the principal ray L30 of the incident light that is incident into the diffraction surface 12a is incident at an angle α of 12.0° with respect to the y axis. The coordinate of the intersection point A between the Rowland circle 14 and the first-order diffracted light L36 having a wavelength of 380 nm is A(5.86, 15.25), and the coordinate of the intersection point B between the Rowland circle 14 and the first-order diffracted light L37 having a wavelength of 730 nm is B(7.51, 13.12). The angle between the surface (xz surface) 12a2 including the perpendicular axis perpendicular to the normal line y of the surface vertex 12c and the non-diffraction surface 12b is set to θ. In addition, associated parameters are defined as follows.

$$b = \sin^{-1} NA$$

$$\Theta = \tan^{-1}\left(\frac{y_1 - y_2}{x_1 - x_2}\right)$$

$$\begin{cases} x_1 = \dfrac{sR \pm \sqrt{s^2R^2 - (1+s^2)}}{1+s^2} \\ y_1 = sx_1 \end{cases}$$

$$s = \tan(90 - \beta_2)$$

$$\beta_2 = \sin^{-1}(N\lambda_2 - \sin\alpha)$$

$$\begin{cases} x_2 = \dfrac{D}{2} \\ y_2 = 2R - \sqrt{4R^2 - \dfrac{D^2}{4}} \end{cases}$$

Herein, α: incident angle (degree) of the light ray that is incident into the diffraction element.

$\beta_2$: first-order diffraction angle (degree) of the light having the longest wavelength that is detected by the light detection unit 13.

N: number of grating grooves (grooves/mm) of the grating of the diffraction surface 12a per unit length (1 mm)

$\lambda_2$: longest wavelength (mm) that is detected by the light detection unit 13.

NA: numerical aperture of the light beam that passes through the incidence slit.

R: radius (mm) of the aforementioned circle.

D: effective area (mm) of the diffraction surface of the diffraction element.

At this time, $$-90 < \theta < \frac{\Theta + \alpha + b - 90}{2}.$$

is satisfied. Herein, the angle Θ is an angle between a straight line connecting B(7.51, 13.12) and C(3.50, 0.0877) and the x axis, in which Θ=72.90. In addition, the angle θ is set so that 90<θ<3.10 is satisfied. In the embodiment, as illustrated in FIG. 4, the angle θ between the surface 12a2 perpendicular to the normal direction 12a1 of the surface vertex 12c of the diffraction surface 12a and the surface 12b other than the diffraction surface 12a is θ=0°. The equations of straight lines for the light rays L33 and L34 that are reflected on the surfaces 12b other than the diffraction surface 12a are calculated from the angle θ between the surface 12a2 perpendicular to the normal direction 12a1 of the surface vertex of the diffraction surface 12a and the surface 12b other than the diffraction surface 12a as illustrated in FIG. 4 are expressed by the following Equations.

$$L33: y = \tan(90 - \alpha - b + 2\theta)x + C_1 \quad (6)$$

$$L34: y = \tan(90 - \alpha + a + 2\theta)x + C_2 \quad (7)$$

Herein, $C_1$ and $C_2$ are constants that are obtained by the following Equations.

$$C_1 = 2R - \sqrt{4R^2 - \frac{D^2}{4}} - \frac{D}{2}\tan(90 - \alpha - b + 2\theta) \quad (8)$$

$$C_2 = 2R - \sqrt{4R^2 - \frac{D^2}{4}} + \frac{D}{2}\tan(90 - \alpha + a + 2\theta) \quad (9)$$

In the embodiment, the constants $C_1$ and $C_2$ of Equations (8) and (9) are $C_1$=−7.77 and $C_2$=973.54. Since the light detection unit 13 needs to be disposed insides the light rays L33 and L34 that are reflected on the surfaces 12b other than the diffraction surface 12a, the coordinates A and B need to be disposed in the area that satisfies the following Equation.

$$\tan(90-\alpha-b+2\theta)x+C_1 < y < \tan(90-\alpha+a+2\theta)x+C_2 \quad (10)$$

In Equation (10), $$y \geq \tan(90-\alpha+a+2\theta)x+C_2$$

If the coordinate B is in the above area, the light ray L33 reflected on the surface 12b other than the diffraction surface 12a is incident into the light detection unit 13, so that the accuracy of detection deteriorates. Similarly, if the coordinate A is in the following area, $$y \leq \tan(90-\alpha-b+2\theta)x+C_1$$

the light ray L34 reflected on the surface 12b other than the diffraction surface 12a is incident into the light detection unit 13, so that the accuracy of detection also deteriorates. In addition, similarly to the light rays reflected on the surface 12b other than the diffraction surface 12a, since the zeroth-order diffracted light is also a light ray that is not spectrally diffracted, the zeroth-order diffracted light L35 needs not to be detected by the light detection unit 13. Therefore, preferably, the light detection unit 13 is disposed inside the diffracted light L35, that is, at the position where the zeroth-order diffracted light L35 is not incident. The Equation of the straight line for the zeroth-order diffracted light L35 is expressed by the following Equation.

$$L35: y = \tan(90-\alpha)x \quad (11)$$

Therefore, in order that the light detection unit 13 is disposed inside the zeroth-order diffracted light L35, it is preferable that the light detection unit 13 is disposed in the area where the following Equation (12) is satisfied.

$$\tan(90-\alpha-b+2\theta)x+C_1 < y < \tan(90-\alpha)x \quad (12)$$

Also in this case, similarly, if the coordinate A is in the following area, $$y \leq \tan(90-\alpha)x$$

the zeroth-order diffracted light L35 reflected by the diffraction surface 12a is incident into the light detection unit 13, so that the accuracy of detection deteriorates. In the embodiment, the coordinate of the intersection point A between the Rowland circle 14 and the first-order diffracted light L36 having a wavelength of 380 nm is A(5.86, 15.25), and the coordinate of the intersection point B between the Rowland circle 14 and the first-order diffracted light L37 having a wavelength of 730 nm is B(7.55, 13.17). With respect to the coordinate A, the left handed sides of Equations (10) and (12) are as follows.

$$\tan(90-\alpha-b+2\theta)x+C_1=5.84$$

The right handed side of Equation (10) is as follows.

$$\tan(90-\alpha+a+2\theta)x+C_2=26523$$

The right handed side of Equation (12) is as follows.

$$\tan(90-\alpha)x=27.57$$

Therefore, the coordinate A satisfies Equations (10) and (12). Similarly, with respect to the coordinate B, the left handed sides of Equations (10) and (12) are as follows.

$$\tan(90-\alpha-b+2\theta)x+C_1=9.76$$

The right handed side of Equation (10) is as follows.

$$\tan(90-\alpha+a+2\theta)x+C_2=31364$$

The right handed side of Equation (12) is as follows.

$$\tan(90-\alpha)x=35.52$$

Therefore, the coordinate B satisfies Equations (10) and (12). Accordingly, the coordinates A and B satisfy Equations (10) and (12); the light detection unit 13 is disposed inside the light rays L33 and L34 reflected by the surfaces 12b other than the diffraction surface 12a; and the light detection unit 13 is disposed inside the zeroth-order diffracted light L35. The light detection unit 13 is disposed inside the optical paths of the light beams regularly reflected by the non-diffraction surfaces 12b that are disposed at outer sides of the diffraction surface 12a. In addition, if the θ is set so that the above condition is satisfied in the direction perpendicular to the spectral direction, since a height of the sensor is 0.5 mm, the light detection unit 13 is disposed inside the optical paths of the light beams reflected by the surfaces 12b other than the diffraction surface 12a.

The light detection unit 13 is protected by a package such as a cover glass. Therefore, if the angle of the light ray that is incident into the light detection unit 13 is increased, the transmittance is decreased due to the Fresnel reflection, so that the light detection efficiency deteriorates. The change in transmittance according to the incident angle for the cover glass is illustrated in FIG. 5. Since the components associated with the Fresnel reflection exist, the incident angle is 0°, and the maximum of the transmittance is 96%. At this time, in order to increase the transmittance up to 90% or more, the incident angle of the light ray L36 having the shortest wavelength that is incident into and detected by the light detection unit 13 needs to be set to 60° or less. It is preferable that, in order to more efficiently detect the light ray, the incident angle is set to 50° or less, more preferably, to 40°; and the transmittance is set to 95% or more.

In the embodiment, the angle between the light detection unit 13 and the light ray L36 having the shortest wavelength is 29.8°, and the transmittance is 95.6%. More efficiently, in order that the light other than the light that is spectrally reflected by the diffraction element 12 is not allowed to be incident into the light detection unit 13, the light shielding plate having the aperture that passes through only the necessary first-order diffracted light may be disposed in the peripheral portion in front of the light detection unit 13. According to the configuration, it is possible to easily perform light detection at high accuracy without reception of the light ray reflected on the surface 12b other than the diffraction surface 12a by the light detection unit 13. In addition, the light detection unit 13 is disposed at the position where the zeroth-order light is not received, so that it is possible to easily perform light detection at higher accuracy.

Second Embodiment

Figure 6:
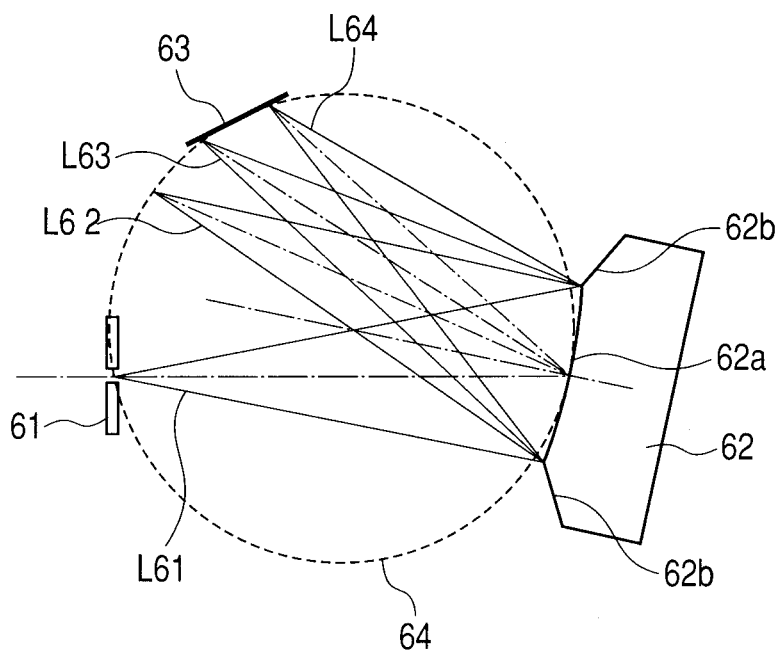
FIG. 6 is a schematic cross-sectional view illustrating a spectrometer according to a second embodiment of the present invention as viewed in a spectral direction.
Figure 7:
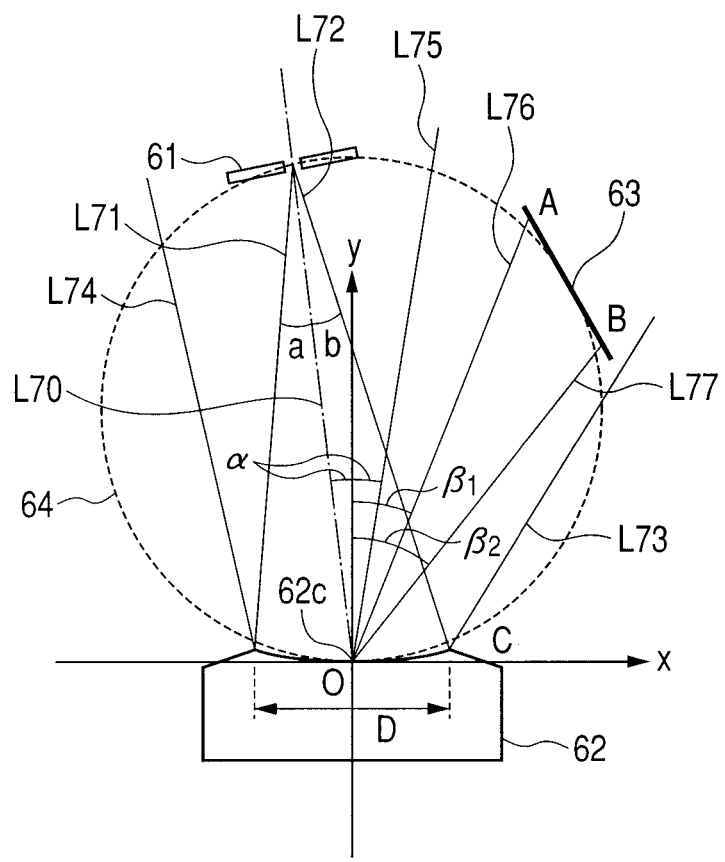
FIG. 7 is a view for explaining a locating site of a light detection unit 63 of FIG. 6.
Figure 8:
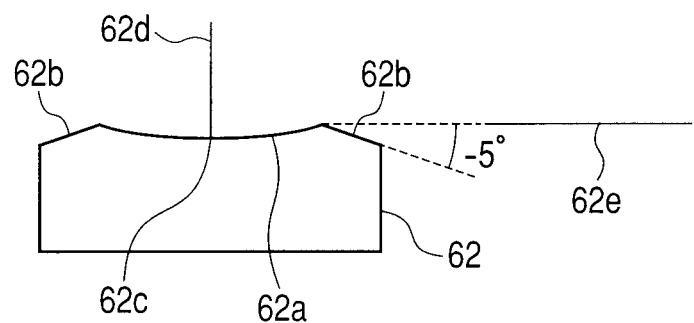
FIG. 8 is a view illustrating a shape of a cross section of a diffraction element 62 of FIG. 6.

Now, a spectrometer according to a second embodiment of the present invention is described with reference to FIGS. 6 to 8. FIG. 6 is a schematic cross-sectional view illustrating the spectrometer according to the second embodiment of the present invention as viewed in a spectral direction. FIG. 7 is a view for explaining a locating site of a light detection unit 63 of FIG. 6. FIG. 8 is a view illustrating a shape of a cross section of a diffraction element 62 of FIG. 6. An angle θ between the surface 62e perpendicular to the normal direction 62d of the surface vertex 62c of the diffraction surface 62a and the surface 62b other than the diffraction surface 62a is θ=−5°. In the figures, an incident aperture stop 61 is configured to limit passing of light reflected or dispersed by an object (not illustrated). The diffraction element 62 has the diffraction surface 62a. In the diffraction surface 62a, the shape of a base surface is anamorphic, and a diffraction grating, of which grating grooves are formed in an equal pitch, is inscribed.

In the embodiment, the surfaces 62b other than the diffraction surface 62a, which are disposed at the same side as the diffraction surface 62a, have no curvature. The angle θ between the surface 62e perpendicular to the normal direction 62d of the surface vertex 62c of the diffraction surface 62a and the surface 62b other than the diffraction surface 62a is θ=−5°. The surface 62b is a glossy surface which is formed by performing a buffing or glossing finishing process (mirror reflection). In addition, the diffraction element 62 is made from a resin. However, the material of the diffraction element 12 is not limited to a resin, but a high-reflectance material such as a metal may be used. In order to increase the reflectance of the diffraction surface 62a of the diffraction element 62, a reflection film may be formed on the diffraction surface 62a. Therefore, a sufficient reflected light amount can be obtained, so that detection accuracy can be increased.

The light detection unit 63 includes, for example, light detection devices such as CMOS sensors or photodiodes. The light detection unit 13 is configured to be a line sensor where the light detection devices are arrayed in a row in the spectral direction of the spectral light of the diffraction element 62. The light detection unit 63 may be configured to be an area sensor where the light detection devices are two-dimensionally arrayed. Due to this configuration, the detection signals can be recognized more accurately. The reference numeral 64 denotes a Rowland circle, and the incident aperture stop 61, the diffraction element 62, and the light detection unit 63 are disposed on the circumference of the Rowland circle 64, so that the light diffracted by the diffraction element 62 can be detected by the light detection unit 63. An incident light ray L61 is reflected on an object and passes through the incident aperture stop 61. A zeroth-order diffracted light (light ray) L62 is reflected on the diffraction surface 62a. A first-order diffracted light L63 has the shortest wavelength that is detected by the light detection unit 63. In the embodiment, the first-order diffracted light L63 has a wavelength of 380 nm.

A first-order diffracted light L64 has the longest wavelength that is detected by the light detection unit 63. In the embodiment, the first-order diffracted light L64 has a wavelength of 730 nm. A light ray L70 is a principal ray of a light beam that passes through the incident aperture stop 61. The principal ray L70 is incident into the surface vertex 62c of the diffraction surface 62a. Among the light rays that pass through the incident aperture stop 61, a light ray (marginal light ray) L71 is incident into a negative side (x<0) of the surface 62b other than the diffraction surface 62a. The angle between the principal ray L70 and the marginal light ray L71 is a. Among the light rays that pass through the incident aperture stop 61, a marginal light ray L72 is incident into a positive side (x>0) of the surface 62b other than the diffraction surface 62a. The angle between the principal ray L70 and the marginal light ray L72 is b. A light ray L73 is the light ray that is closest to the diffraction surface 62a among the light rays that are reflected on the positive side of the surface 62b other than the diffraction surface 62a.

A light ray L74 is the light ray that is closest to the diffraction surface 62a among the light rays that are reflected on the negative side of the surface 62b other than the diffraction surface 62a. A light ray L75 is a principal ray of a reflected light (zeroth-order diffracted light) reflected by the diffraction surface 62a. In the figure, an angle between the y axis and the principal ray L75 is a reflection angle α. A light ray L76 is a principal ray of a first-order diffracted light that is obtained by reflecting the light having the shortest wavelength $\lambda_1$ (nm), which is detected by the light detection unit 63, by the diffraction surface 62a. In the figure, an angle between the y axis and the principal ray L76 of the first-order diffracted light is a diffraction angle $\beta_1$. A light ray L77 is a principal ray of a first-order diffracted light that is obtained by reflecting the light having the longest wavelength $\lambda_2$ (nm), which is detected by the light detection unit 63, by the diffraction surface 62a. In the figure, an angle between the y axis and the principal ray L37 of the first-order diffracted light is a diffraction angle $\beta_2$. The specifications of the spectrometer and the shape of the diffraction surface 62a of the diffraction element 62 according the embodiment are listed in Tables 3 and 4.

TABLE 3

(Specifications of Spectrometer)

| | |
|---|---|
| spectral range | wavelength of 350 nm to 750 nm |
| slit width of incident aperture stop | 60 μm |
| detection device (light detection unit) | Si photodiode array |
| diffraction order m | 1 |
| pixel size of detection device | 25 × 500 μm |
| wavelength resolution | 3.3 nm |

TABLE 4

(Specifications of diffraction element)

| | |
|---|---|
| base meridional curvature radius [mm] | 17.50 |
| base sagittal curvature radius [mm] | 15.45 |
| effective diameter [mm] | 7 |
| grating pitch [μm] | 1.5 |
| grating height [μm] | 0.15 |
| blaze angle [°] | 5.72 |
| incident angle [°] | 12 |
| reflection film | multilayered film of Al base |

In the embodiment, the incident aperture stop 61, the diffraction surface 62a, and the light detection unit 63 are disposed on the circumference of the Rowland circle 64. The light rays that are reflected or dispersed by an object (not illustrated), of which color is to be measured, pass through the incident aperture stop 61 and are incident into the diffraction element 62. Among the light rays that are incident into the diffraction element 62, the diffracted light rays reflected by the diffraction surface 62a are focused on the circumference of the Rowland circle 64. Among the light rays that are incident into the diffraction element 62, the light rays reflected by the surface 62b other than the diffraction surface 62a are emitted as the regularly-reflected light rays.

In FIG. 7, the surface vertex 62c of the diffraction surface 62a of the diffraction element 62 is set to the origin O(0, 0); the y axis is set to the normal direction of the diffraction surface 62a; and the x axis is set to the direction perpendicular to the y axis. The direction perpendicular to the x axis and the y axis is set to the z axis. The shape of the diffraction surface 62a of the diffraction element 62 is the same as that in the first embodiment. In the diffraction surface 62a of the diffraction element 62, the curvature radius of the meridional line is 17.5 mm, and the curvature radius of the sagittal line is 15.45 mm. In addition, the effective area D is 7 mm. In addition, in the diffraction surface 62a, the diffraction grating similar to that of FIG. 2 is formed, and the grating pitch d of the diffraction grating is 1.5 μm, and the blaze angle θ is 5.72°. In this case, the number of grating grooves N is 666.7 grooves/mm. The light that is spectrally reflected by the diffraction element 62 is focused on the light detection unit 63 that is disposed on the circumference of the Rowland circle 64.

In the embodiment, the light rays detected by the light detection unit 63 are in a wavelength range of 380 to 730 nm. The light rays L63 and L76 are the first-order diffracted lights having a wavelength of 380 nm. The light rays L64 and L77 are the first-order diffracted lights having a wavelength of 730 nm. By Equation (1) and (2), in the case of m=1, the first-order diffraction angle $\beta_1$ for the wavelength of 380 nm is 27.5°, and the first-order diffraction angle $\beta_2$ for the wavelength of 730 nm is 44.0°. The light detection unit 63 is disposed in the area where the first-order diffracted light in a wavelength range of 380 nm to 730 nm is received. In addition, in order that unnecessary light is not incident into the light detection unit 63, the light detection unit 63 needs to be disposed inside the optical paths of the light rays L73 and L74 that are reflected by the surfaces 62b other than the diffraction surface.

Since the radius of the Rowland circle 64 is ½ the curvature radius (=17.5 mm) of the diffraction surface 62a, R=8.75 mm. The equation of the Rowland circle 64 is expressed by Equation (5). In addition, the angles a and b of the marginal light rays L71 and L72 with respect to the principal ray L70 of the light beam that passes through the incident aperture stop 61 are a=11.8° and b=11.3°. The numerical aperture NA of the light beam that is emitted through the incidence aperture stop 61 is NA=0.2. In addition, the principal ray L70 of the incident light that is incident into the diffraction surface 62a is incident at an angle α of 12.0° with respect to the y axis. The coordinate of the intersection point A between the Rowland circle 64 and the first-order diffracted light L76 having a wavelength of 380 nm is A(7.16, 13.78), and the coordinate of the intersection point A between the Rowland circle 64 and the first-order diffracted light L77 having a wavelength of 730 nm is B(8.84, 9.16).

The aforementioned Θ is an angle between a straight line connecting B(8.84, 9.16) and C(3.50, 0.0877) and the x axis, in which Θ=59.52. In addition, the angle θ is set so that −90<θ<−3.59 is satisfied. In the embodiment, the angle θ between the surface 62a perpendicular to the normal direction y of the surface vertex 62c of the diffraction surface 62a and the surface 62b other than the diffraction surface 62a is θ=−5.0°. The equations of straight lines for the light rays L73 and L74 that are reflected on the surfaces 62b other than the diffraction surface 62a are calculated from the angle between the surface 62e perpendicular to the normal direction y of the surface vertex 62c of the diffraction surface 62a and the surface 62b other than the diffraction surface 62a as illustrated in FIG. 4 are expressed by the following Equations.

$$L73: y=\tan(90-\alpha-b+2\theta)x+C_3 \quad (13)$$

$$L74: y=\tan(90-\alpha+a+2\theta)x+C_4 \quad (14)$$

Herein, $C_3$ and $C_4$ are constants that are obtained by the following Equations.

$$C_3 = 2R - \sqrt{4R^2 - \frac{D^2}{4}} - \frac{D}{2}\tan(90 - \alpha - b + 2\theta) \quad (15)$$

$$C_4 = 2R - \sqrt{4R^2 - \frac{D^2}{4}} + \frac{D}{2}\tan(90 - \alpha + a + 2\theta) \quad (16)$$

In the embodiment, the constants $C_3$ and $C_4$ of Equations (15) and (16) are $C_3 = -4.97$ and $C_4 = -19.09$. Since the light detection unit 63 needs to be disposed insides the light rays L73 and L74 that are reflected on the surfaces 62b other than the diffraction surface 62a, the coordinates A and B need to be disposed in the area that satisfies the following Equation.

$$\tan(90-\alpha-b+2\theta)x+C_3 < y < \tan(90-\alpha+a+2\theta)x+C_4 \quad (17)$$

In Equation (17), if the coordinate B is in the following area, $$y \geq \tan(90-\alpha+a+2\theta)x+C_4$$

the light ray L73 reflected on the surface 62b other than the diffraction surface 62a is incident into the light detection unit 63, so that the accuracy of detection deteriorates. Similarly, if the coordinate A is in the following area, $$y \leq \tan(90-\alpha-b+2\theta)x+C_3$$

the light ray L74 reflected on the surface 62b other than the diffraction surface 62a is incident into the light detection unit 63, so that the accuracy of detection also deteriorates. The light detection unit 63 is disposed inside the optical paths of the light beams regularly reflected by the non-diffraction surfaces 62b that are disposed at outer sides of the diffraction surface 62a. In addition, similarly to the light rays reflected on the surface 62b other than the diffraction surface 62a, since the zeroth-order diffracted light L75 is also a light ray that is not spectrally diffracted, the zeroth-order diffracted light L75 needs not to be detected by the light detection unit 63. Therefore, preferably, the light detection unit 63 is disposed inside the zeroth-order diffracted light L75. The Equation of the straight line for the zeroth-order diffracted light L75 is expressed by the following Equation.

$$L75: y = \tan(90-\alpha)x \quad (18)$$

Therefore, in order that the light detection unit 63 is disposed inside the zeroth-order diffracted light L75, it is preferable that the light detection unit 63 is disposed in the area where the following Equation (19) is satisfied.

$$\tan(90-\alpha-b+2\theta)x+C_3 < y < \tan(90-\alpha)x \quad (19)$$

Also in this case, similarly, $$y \leq \tan(90-\alpha)x$$

if the coordinate A is in the above area, the zeroth-order diffracted light L75 reflected by the diffraction surface 62a is incident into the light detection unit 63, so that the accuracy of detection deteriorates. In the embodiment, the coordinate of the intersection point A between the Rowland circle 64 and the first-order diffracted light L76 having a wavelength of 380 nm is A(7.16, 13.78), and the coordinate of the intersection point B between the Rowland circle 64 and the first-order diffracted light L77 having a wavelength of 730 nm is B(8.74, 9.06). With respect to the coordinate A, the left handed sides of Equations (17) and (19) are as follows.

$$\tan(90-\alpha-b+2\theta)x+C_3=5.93$$

The right handed side of Equation (17) is as follows.

$$\tan(90-\alpha+a+2\theta)x+C_4=20.70$$

The right handed side of Equation (19) is as follows.

$$\tan(90-\alpha)x=33.69$$

Therefore, the coordinate A satisfies Equations (17) and (19). Similarly, with respect to the coordinate B, the left handed sides of Equations (17) and (19) are as follows.

$$\tan(90-\alpha-b+2\theta)x+C_1=8.34$$

The right handed side of Equation (17) is as follows.

$$\tan(90-\alpha+a+2\theta)x+C_2=29.49$$

The right handed side of Equation (19) is as follows.

$$\tan(90-\alpha)x=41.12$$

Therefore, the coordinate B satisfies Equations (17) and (19). Accordingly, the coordinates A and B satisfy Equations (17) and (19); the light detection unit 63 is disposed inside the light rays L73 and L74 reflected by the surfaces 62b other than the diffraction surface 62a; and the light detection unit 63 is disposed inside the zeroth-order diffracted light L75. In addition, if the θ is set so that the above condition is satisfied in the direction perpendicular to the spectral direction, since a height of the sensor is 0.5 mm, the light detection unit 63 is disposed inside the optical paths of the light beams reflected by the surfaces 62b other than the diffraction surface 62a.

The light detection unit 63 is protected by a package such as a cover glass. Therefore, if the angle of the light ray that is incident into the light detection unit 63 is increased, the transmittance is decreased due to the Fresnel reflection, so that the light detection efficiency deteriorates. The change in transmittance according to the incident angle for the cover glass is illustrated in FIG. 5. Since the components associated with the Fresnel reflection exist, the incident angle is 0°, and the maximum of the transmittance is 96%. At this time, in order to increase the transmittance up to 94% or more, the incident angle of the light ray L76 having the shortest wavelength that is incident into and detected by the light detection unit 63 needs to be set to 50° or less. It is preferable that, in order to more efficiently detect the light ray, the incident angle is set to 40° or less; and the transmittance is set to 95% or more.

In the embodiment, the angle between the light detection unit 63 and the light ray L76 having the shortest wavelength is 44.0°, and the transmittance is 94.8%. As described above, it is possible to easily perform light detection at high accuracy without reception of the light ray reflected on the surface 62b other than the diffraction surface 62a by the light detection unit 63. In addition, the light detection unit 63 is disposed at the position where the zeroth-order light is not received, so that it is possible to easily perform light detection at higher accuracy. According to the above embodiments, components are disposed so that the light rays reflected on the surfaces other than the diffraction surface are not incident into the light detection unit. Therefore, it is possible to implement a spectrometer capable of detecting color light rays at high accuracy with a simple, small-sized configuration.

Third Embodiment

Figure 9:
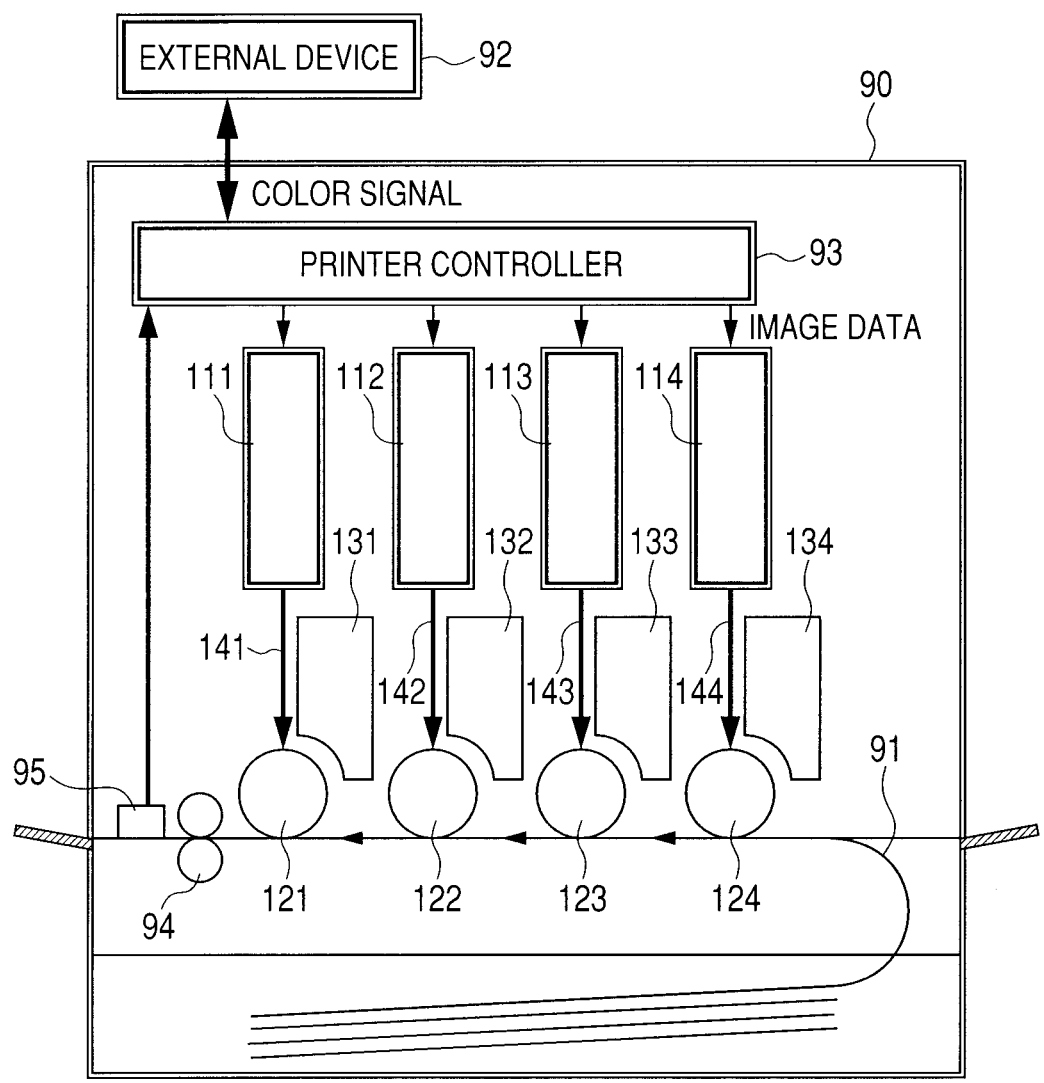
FIG. 9 is a diagrammatic view illustrating main components in a configuration of an image forming apparatus using a spectrometer, according to a third embodiment of the present invention.

FIG. 9 is a schematic diagrammatic view illustrating main components in a color image forming apparatus (image forming apparatus) using a spectrometer, according to a third embodiment of the present invention. The image forming apparatus according to the embodiment is a tandem type color image forming apparatus where four light scanning units are aligned and image information is recorded on corresponding image bearing members, that is, photosensitive drums. In FIG. 9, a color image forming apparatus 90; light scanning units 111, 112, 113, and 114; the photosensitive drums 121, 122, 123, and 124 as the image bearing members; developing units 131, 132, 133, and 134; an intermediate transfer belt 91; and a fixing unit 94 are illustrated.

In FIG. 9, the color image forming apparatus 90, R (red), G (green), and B (blue) color signals are input from an external device 92 such as a personal computer. The color signals are converted into C (cyan), M (magenta), Y (yellow), and K (black) image data (dot data) by a printer controller 93 in the color image forming apparatus 90. The image data are input to the corresponding light scanning units 111, 112, 113, and 114. Next, light beams 141, 142, 143, and 144 modulated based on each of the image data are emitted from the light scanning units. The photosensitive surfaces of the photosensitive drums 121, 122, 123, and 124 are scanned in the main scanning direction by the light beams.

In the color image forming apparatus according to the embodiment, the four light scanning units (111, 112, 113, and 114) are aligned to correspond to the colors of C (cyan), M (magenta), Y (yellow), and K (black). Image signals (image information) are recorded on the photosensitive drums 121, 122, 123, and 124 in a parallel manner, so that a color image can be printed at a high speed.

In the color image forming apparatus according to the embodiment, as described above, through the four light scanning units 111, 112, 113, and 114, latent images corresponding to the colors are formed on surfaces of the corresponding photosensitive drums 121, 122, 123, and 124 by using the light beams according to each of the image data. Then, the latent images are developed by each of the developing units, and the color images are overlappedly transferred to the intermediate transfer belt. Then, the image is transferred to a recording medium, and the image is formed on the recording medium by the fixing unit.

In the image forming apparatus, a spectrometer 95 for detection chromaticity according to the first or second embodiment is disposed to face an image forming surface of a recording medium after a fixing unit 94 in a transport direction for the recording medium. Herein, the spectrometer 95 having the configuration of the first embodiment is used. The chromaticity of a color patch (patch for chromaticity detection) that is formed and fixed on the recording medium by the image forming apparatus 90 is detected by the spectrometer 95. The color patch measurement after the fixing on the recording medium is performed in order that the color matching is performed after the change in the chromaticity due to the fixing is considered. The result of detection is transmitted to a printer controller 93, and the printer controller 93 determines whether the color reproduction of the output monochromic patch is appropriately performed. If a color difference between the chromaticity of the output monochromic patch and the chromaticity instructed by the printer controller 93 is in a predetermined range, the color calibration is finished. If the color difference is not in the predetermined range, the printer controller 93 performs the color calibration based on information of the color difference until the color difference is in the predetermined range. In this manner, the spectrometer 95 according to the present invention is adapted to the image forming apparatus, so that a high-performance color calibration can be performed.

While the invention has been particularly illustrated and described with reference to exemplary embodiments thereof, it will be understood by those skilled in the art that various changes and modifications may be made therein without departing from the spirit and scope of the invention as defined by the appended claims.

This application claims the benefit of Japanese Patent Application No. 2009-111747 filed May 1, 2009, which is hereby incorporated by reference herein in its entirety.

What is claimed is:

1. A spectrometer comprising:
   a reflection type diffraction element having a diffraction area with a concave surface that diffracts an incident light beam, and a non-diffraction area located outside the diffraction area;
   an aperture stop that regulates the incident light beam incident on the diffraction element; and
   a light detection unit located at an imaging position to receive a first-order diffracted light diffracted by the diffraction element,
   wherein the diffraction element is composed of a resin,
   wherein a reflection ratio of the diffraction area is higher than a reflection ratio of the non-diffraction area,
   wherein the light detection unit is disposed inside an optical path of a light beam regularly reflected on the non-diffraction area outside the diffraction area, and
   wherein an optical path from an opening of the aperture stop to the diffraction area has no light shielding element.

2. The spectrometer according to claim 1, wherein the aperture stop, the diffraction area, and the light detection unit are located on a circumference of a same Rowland circle.

3. The spectrometer according to claim 2, wherein, when an angle between a surface of the non-diffraction area, which extends perpendicular to a normal line at a surface of the diffraction area, and the surface of the diffraction area form a surface vertex intersecting the normal line, is set θ (degrees), the following condition is satisfied:

$$-90 < \theta < \frac{\Theta + \alpha + b - 90}{2}$$

where:

$$b = \sin^{-1} NA$$

$$\Theta = \tan^{-1}\left(\frac{y_1 - y_2}{x_1 - x_2}\right)$$

$$\begin{cases} x_1 = \dfrac{sR \pm \sqrt{s^2 R^2 - (1+s^2)}}{1+s^2} \\ y_1 = sx_1 \end{cases}$$

$$s = \tan(90 - \beta_2)$$

$$\beta_2 = \sin^{-1}(N\lambda_2 - \sin\alpha)$$

$$\begin{cases} x_2 = \dfrac{D}{2} \\ y_2 = 2R - \sqrt{4R^2 - \dfrac{D^2}{4}} \end{cases}$$

where:

α: incident angle (degree) of the light beam that is incident into the diffraction element;

$\beta_2$: first-order diffraction angle (degree) of the light beam having the longest wavelength that is detected by the light detection unit;

N: number of grating grooves (grooves/mm) of the grating of the diffraction area per unit length (1 mm);

$\lambda_2$: longest wavelength (mm) that is detected by the light detection unit;

NA: numerical aperture of the light beam that passes through the aperture stop;

R: radius (mm) of the Rowland circle; and

D: effective area (mm) of the diffraction area of the diffraction element.

4. The spectrometer according to claim 1, wherein the light detection unit is located outside an optical path of a zero-order diffracted light diffracted by the diffraction area.

5. The spectrometer according to claim 1, further including a reflection film on the diffraction area of the diffraction element.

6. The spectrometer according to claim 1, wherein an incident angle of a light beam having the shortest wavelength among the diffracted light, which is detected by the light detection unit and is incident into the light detection unit, is 50 degrees or less with respect to a normal direction of the light detection unit.

7. The spectrometer according to claim 1, further including a light shielding plate disposed in a peripheral portion of the light detection unit.

8. An image forming apparatus including a spectrometer comprising:

a reflection type diffraction element having a diffraction area with a concave surface that diffracts an incident light beam, and a non-diffraction area located outside the diffraction area;

an aperture stop that regulates the incident light beam incident on the diffraction element; and a light detection unit located at an imaging position to receive a first-order diffracted light diffracted by the diffraction element, wherein the diffraction element is composed of a resin, wherein a reflection ratio of the diffraction area is higher than a reflection ratio of the non-diffraction area, wherein the light detection unit is disposed inside an optical path of a light beam regularly reflected on the non-diffraction area outside the diffraction area, and wherein an optical path from an opening of the aperture stop to the diffraction area has no light shielding element.

9. The spectrometer according to claim 1, wherein the aperture stop and the diffraction element are discrete and separate members.

10. The spectrometer according to claim 1, wherein the wavelength of the incident light beam ranges from 380 nm to 730 nm.

* * * * *